Patented Dec 14 1948

2,456,467

UNITED STATES PATENT OFFICE 2,456,467

LAMINATED TRANSPARENT PLASTIC

David A. Swedlow, North Hollywood, Calif., assignor, by mesne assignments, to Shellmar Products Corporation, Chicago, Ill., a corporation of Delaware No Drawing. Application March 9, 1942, Serial No. 434,018

6 Claims. (Cl. 154—139)

My invention relates to laminated transparent plastics, and more particularly to a laminated, crystal clear plastic able to withstand extreme low temperatures without shattering, and which can be formed and molded after lamination into substantially any desired contour for use, for example, as windows in pressure cabins for airplanes equipped to fly at high altitudes, or for automobiles, ships and submersibles.

For example, in airplanes equipped to fly at high altitudes, pressure cabins, while not essential, are desirable in order that these cabins may be supercharged and maintained at an air pressure at which the personnel in the cabin can be comfortable, and can breathe properly without use of individual oxygen supplies. Such pressure cabins, however, must have windows for good vision, particularly for the pilot and the navigator, as well as for the gunners operating the gun turrets in military airplanes. The use of some transparent material is required, as a part of the wall of the pressure cabin. Up to the present time, as far as is known, only laminated glass has been used.

Glass can be laminated so that when it is punctured by a bullet, the glass portions, even though shattered, will not under most circumstances fly or collapse, thereby preventing injury to the personnel by flying glass particles, and also preventing the outrush of inward pressure except through the bullet hole itself. However, glass becomes workable only at such high temperatures that it is not possible to form laminated glass into contours that depart greatly from the planar, without completely destroying the qualities of the plastic material binding the two sheets of glass together and thereby destroying the lamination. Furthermore, laminated glass is heavy, and if transparent crystal clear plastics can be used in place of glass, a great saving in weight will be made in building pressure cabins for airplanes. Furthermore, more extended portions of the walls of the pressure cabins could be made out of transparent plastic material, inasmuch as the transparent plastics are easily formed by heat and pressure into shapes having curvatures of relatively short radii. A laminated plastic has similar advantages when used in other vehicles mentioned herein.

However, the transparent plastics, and particularly those which have a sufficient clarity to be utilized in airplane cabins or in other structures where the best possible vision is required, are presently of the acrylic type such as for example, "Lucite" and "Plexiglas." "Lucite" and "Plexiglas" are acrylic plastics comprising polymethyl methacrylate manufactured, respectively, by E. I. du Pont de Nemours and Company, Inc., and Rohm and Haas Company. These two plastics have been approved by the Army and Navy for use on airplanes where vision through the plastics is required. However, even such plastics, while sufficiently tough to resist shattering at relatively high temperatures, become brittle at lower temperatures. When temperatures of from $-30°$ F. to $-80°$ F. are reached, they are substantially as brittle as glass, and will shatter substantially as easily as a single glass sheet when hit by a bullet.

I have found however, that when such crystal clear plastic materials are properly laminated with a clear binding layer of a different type of plastic, such as one which is capable of resisting low temperatures without becoming brittle, a laminated, completely transparent plastic can be obtained which will not shatter at the lowest temperatures encountered by high altitude planes. The laminated plastics thus produced have a large number of advantages over laminated glass, in that the laminated plastic can just as readily be formed under heat and pressure, after lamination as before. Thus, large sheets of crystal clear transparent plastic can be laminated with a low temperature resisting binding sheet. After these sheets are bonded, the composite laminated material can be shaped by heat and pressure substantially into any desired contour for use in pressure cabins without destroying the light transmission therethrough.

It is therefore, the main object of my present invention, to provide a method of laminating sheets of acrylic plastics, by placing between these sheets a layer of a different type of plastic which retains its elasticity, adherence and toughness even at extreme low temperatures. The resultant sheet is in itself completely transparent, can easily be formed into desired contours even at short radii of curvature, and the completed panel irrespective of its curvature, will have an optical transparency at all temperatures. The laminated material will hold together without shattering and without substantial loss of material upon the traverse of a bullet therethrough, so that the damage due to bullet traversal, is substantially limited to the bullet puncture hole itself. Transparent panels made in accordance with my present invention have all of the advantages of laminated glass, plus the additional advantages that the panels are much lighter than corresponding glass panels, and further that the plastic panels can be formed into shapes that cannot be obtained with laminated glass. The word transparent as utilized herein, is utilized in its best sense, namely, meaning that the material is optically transparent, with a minimum distortion of images passing therethrough, and with a minimum loss in light transmission.

In accordance with the present invention an acrylic polymer such as polymerized methyl methacrylate or a polymer comprising polymerized methyl methacrylate is cemented to a resin, such as a vinyl resin, having greater toughness at low temperature.

However, it is known in the art that acrylics are surprisingly incompatible with most other plastics and resins, and even in several instances with each other. (See Simonds, "Industrial Plastics," 1941 edition.) Consequently, in order to obtain a proper laminated structure with the proper bond between two acrylic sheets, certain precautions must be taken, and the methods herein followed.

As stated above, the acrylates referred to, at extreme low temperatures, shatter as badly as glass. Consequently the material utilized to bind the two sheets to form a laminated product should be a material which is capable of withstanding low temperatures, that is, capable of retaining a strong bond with the acrylics at low temperatures, and which will not itself become brittle under such low temperatures. Certain of the vinyl plastics have the property of retaining their toughness under extreme low temperatures.

Inasmuch as I may wish to utilize several types of shatter resistant sheet between two acrylic sheets, two separate methods are given herein, applicable to form a laminated product from different binding materials.

First, I wish to describe a method of utilizing a single vinyl binding sheet between outer acrylic sheets. Two crystal clear preferably flat sheets of "Lucite" or "Plexiglas" are provided for example of ¼ inch thickness and of any extent desired. One surface of each of these sheets is then coated with "Plexigum," which is a solution of an acrylic plastic comprising polyethyl acrylate in a volatile solvent, manufactured by Rohm and Haas Company. I have found "Plexigum B2045A" especially suitable for the process of this invention. By coating the "Lucite" or "Plexiglas" surfaces first with "Plexigum," crazing is decreased. I have found that "Lucite" is more susceptible to crazing than "Plexiglas." Consequently, this step for certain purposes, can be eliminated in laminating "Plexiglas." If used, however, on "Lucite," the treated sheets are heated approximately four hours at 100° F., in order to allow the solvent to evaporate from the coating. One of the coated sheets is then placed in a horizontal position with the coated face up, and a monomer, such as liquid "Lucite," which will polymerize in place, is poured on the sheet.

The proper binding sheet is then selected, such as for example polyvinyl butyral, polyvinyl formal, polyvinyl acetate, polyvinyl chloride or other vinyl resin. "VS 1330" and "XU 1320," polyvinyl butyral plastics manufactured by Carbide and Carbon Co., are well suited for the purpose of my invention. The vinyl sheet is held in a substantially vertical position with one edge thereof registering with the edge of the coated sheet. The vinyl sheet is then lowered into rolling contact with the monomer across the coated sheet to eliminate air bubbles. After contact is made throughout, the vinyl sheet is squeegeed to a final contact. The upper surface of the applied vinyl sheet is then coated with the monomer in the same manner, and the other outside plate is then held upright with edge contact with the two sheets already bonded, and carefully lowered into parallel contact relationship with the monomer so that air bubbles are pushed out ahead of the contact between the sheets. Light pressure is then applied to the laminated product until polymerization takes place.

The laminated sheets thus formed are crystal clear and will withstand shattering even at extreme low temperatures. The sheets are fully as capable, after lamination, of being formed as before. In forming, the laminated sheet is raised to 275° F. and may be draped over a form in a furnace for example, or it may be blown into a female mold under a pressure of 25 to 100 pounds per square inch. The forming in no way harms the sheets, and in fact facilitates the bond.

XU1320 is relatively thin, i. e., about .020". In case a thicker interlayer is desired a plurality of XU1320 sheets can be stacked, bonded by heat and pressure, and the resultant sheet used as an interlayer as above described.

Also, in case it is desired that the thicker VS1330 vinyl have an exceptionally strong bond with the outer sheets, I may desire to interpose XU1320 sheets between a central VS1330 sheet and the "Lucite" or "Plexiglas" outer sheets.

In order to carry out my method in accordance with this latter concept, I may for example, utilize the central low temperature resisting sheet as above set forth, and may then apply the intermediate binding sheets thereto, bonding the three sheets by heat and pressure, to form a clear, flexible low temperature resisting sandwich. When this sandwich has been obtained, it is cemented between the outer "Lucite" or "Plexiglas" sheets in exactly the same manner as has been described above for the binding of a single center sheet to the two outside sheets.

It may be desirable in forming the sandwich to utilize the low temperature resisting material only for the center sheet of the sandwich, and to utilize as binding sheets materials which do not necessarily themselves remain tough at extreme low temperatures, but which do have the property of binding the tough central material to the outer sheets at these temperatures. Likewise, the central material may be of material which remains tough at extreme low temperatures, with the outer layers of the sandwich of a vinyl material which, while resisting low temperatures, does so to a lesser degree than the central material. In any case, however, the central material of the sandwich is to be the most highly resistant to brittleness at extreme low temperatures, and the main function of the intermediate layer is to bind the central tough material to the outer "Lucite" or "Plexiglas."

The final laminated product utilizing the central sandwich instead of a central single sheet, has exactly the same capability of formation after lamination, as has the single central sheet laminated plastic. The material, irrespective of whether it is laminated with a single sheet or with a multi-layer sandwich sheet, is capable of being draped and formed with short radii of curvature under heat and pressure without in any manner impairing the transparency thereof.

I claim:

1. The method of joining a pair of acrylic plastic sheets which comprises coating one of said sheets with a liquid monomer, applying a flexible vinyl sheet to said monomer, coating the free side of said vinyl sheet with said monomer, applying the other acrylic sheet to the latter monomer, and polymerizing said monomer.

2. A method of producing a laminate comprising coating one side of an acrylic plastic sheet with a solution of an acrylic plastic in a volatile solvent, drying the resulting coating, superimposing the coated side of said sheet on a flexible vinyl sheet with a film of polymerizable acrylic monomer interposed between said coating and said vinyl sheet, and polymerizing said monomer.

3. A method of producing a laminate comprising coating one side of each of two acrylic plastic sheets with a solution of polyethyl acrylate in a volatile solvent, drying the resulting coating, coating the coated side of one of said sheets with a polymerizable acrylic monomer, applying a flexible vinyl sheet to said monomer, coating the exposed side of said vinyl sheet with said monomer, applying the coated side of said other sheet of polymethyl methacrylate to the exposed monomer, and polymerizing said monomer.

4. A method of producing a laminate comprising coating one side of a polymethyl methacrylate sheet with a solution of polyethyl acrylate in a volatile solvent, drying the resulting coating, superimposing the coated side of said sheet on a flexible polyvinyl butyral sheet with a film of polymerizable acrylic monomer interposed between said coating and said vinyl sheet, and polymerizing said monomer.

5. A method of producing a laminate comprising coating one side of each of two sheets of polymethyl methacrylate with a solution of polyethyl acrylate in a volatile solvent, drying the resulting coatings, assembling said sheets, coated faces inward, with an intermediate flexible polyvinyl butyral sheet, and with films comprising methyl methacrylate monomer interposed between said polyvinyl butyral sheet and said coatings, and polymerzing said monomer.

6. A laminate comprising a polymethyl methacrylate sheet cemented to a polyvinyl butyral sheet by means of the cementing action of a polymerizable acrylic monomer comprising methyl methacrylate and of a solution of polyethyl acrylate in a volatile solvent.

DAVID A. SWEDLOW.

REFERENCES CITED

The following references are of record in the file of this patent:

UNITED STATES PATENTS

| Number | Name | Date |
|---|---|---|
| 1,872,482 | Messing | Aug. 16, 1932 |
| 2,168,220 | Land | Aug. 1, 1939 |

FOREIGN PATENTS

| Number | Country | Date |
|---|---|---|
| 396,097 | Great Britain | July 31, 1933 |
| 490,381 | Great Britain | Jan. 15, 1938 |
| 157,688 | Austria | Jan. 10, 1940 |

OTHER REFERENCES

Article "Methacrylate Resins" appearing on pages 382-386 of "Industrial and Engineering Chemistry" for Apr. 1939, vol. 31, No. 4. Publication Office, American Chemical Society, 1105 16th St. N. W., Washington, D. C.